(12) United States Patent
Fanson et al.

(10) Patent No.: US 7,359,442 B2
(45) Date of Patent: Apr. 15, 2008

(54) BLOCK ORIENTED DIGITAL COMMUNICATION SYSTEM AND METHOD

(75) Inventors: John Louis Fanson, Otawa (CA); Douglas Hamilton Taylor, Kanata (CA)

(73) Assignee: Intellon Corporation, Ocala, FL (US)

( * ) Notice: Subject to any disclaimer, the term of this patent is extended or adjusted under 35 U.S.C. 154(b) by 0 days.

(21) Appl. No.: 11/466,830

(22) Filed: Aug. 24, 2006

(65) Prior Publication Data

US 2007/0019751 A1 Jan. 25, 2007

Related U.S. Application Data

(63) Continuation of application No. 10/123,141, filed on Apr. 17, 2002, now Pat. No. 7,116,745.

(51) Int. Cl.
*H04L 27/00* (2006.01)
(52) U.S. Cl. ............... 375/259; 375/260; 375/254
(58) Field of Classification Search .......... 375/259, 375/260, 343, 354, 355
See application file for complete search history.

(56) References Cited

U.S. PATENT DOCUMENTS

| | | | |
|---|---|---|---|
| 5,839,101 A * | 11/1998 | Vahatalo et al. | ............ 704/226 |
| 5,930,231 A | 7/1999 | Miller et al. | |
| 6,111,919 A | 8/2000 | Yonge, III | |
| 6,438,367 B1 | 5/2002 | Crawford | |
| 6,577,690 B1 * | 6/2003 | Barman et al. | ............ 375/354 |
| 6,700,388 B1 * | 3/2004 | Mayor et al. | ............... 324/537 |
| 6,751,187 B2 | 6/2004 | Walton et al. | |
| 2002/0122499 A1 | 9/2002 | Kannan et al. | |
| 2002/0127986 A1 | 9/2002 | White et al. | |
| 2003/0026201 A1 * | 2/2003 | Arnesen | ............... 370/210 |
| 2003/0086366 A1 | 5/2003 | Branlund et al. | |
| 2003/0185282 A1 | 10/2003 | Hudson | |
| 2003/0216122 A1 | 11/2003 | Cordone et al. | |

OTHER PUBLICATIONS

Altera Corporation—White Paper "Implementing OFDM Using Altera Intellectual Property," Mar. 2001.
Article "OFDM as a possible modulation technique for multimedia applications in the range of mm waves", by Dusan Matiae, Introduction of OFDM, II Edition, Oct. 30, 1998.

* cited by examiner

*Primary Examiner*—Emmanuel Bayard
(74) *Attorney, Agent, or Firm*—Fish & Richardson P.C.

(57) ABSTRACT

A method and system for estimating a time shift required for symbol synchronization in a block oriented digital communication systems such as an orthogonal frequency division multiplexing (OFDM) or a discrete multi-tone (DMT) data transmission system. The method uses an N/d inverse discrete Fourier transform (IDFT), where N is a sample number and d is a decimation factor, or alternatively an N/(2d) inverse fast Fourier transform (IFFT) for a real received signal or an N/d IDFT for a complex received signal.

20 Claims, 11 Drawing Sheets

BLOCK ORIENTED DIGITAL COMMUNICATION SYSTEM AND METHOD

CROSS-REFERENCE TO RELATED APPLICATIONS

This application is a continuation application of and claims priority to U.S. application Ser. No. 10/123,141, filed on Apr. 17, 2002 now U.S. Pat. No. 7,116,745, incorporated herein by reference.

TECHNICAL FIELD

This invention pertains to symbol acquisition and synchronization for block oriented digital communication systems such as orthogonal frequency division multiplexing (OFDM) or discrete multi-tone (DMT) data transmission systems.

BACKGROUND OF THE INVENTION

In order to properly receive a block oriented digital communication signal, such as orthogonal frequency division multiplexed (OFDM) or discrete multi-tone (DMT) that has been transmitted across a channel, and demodulate the symbols from the received signal, a receiver must determine the timing of the beginning of each symbol within a data frame. If the correct timing is not determined, sequences of symbols demodulated from the received signal will more likely be incorrect, resulting in the transmitted data bits not being correctly recovered.

Also, OFDM and DMT are often used in hostile environments such as networks deployed over home power lines where interference from narrow-band jamming signals can be problematic.

There is therefore a need for a computationally efficient system and method for detecting a time shift required for symbol synchronization of an OFDM or DMT signal that allows a simple means of eliminating narrow-band jamming signals.

SUMMARY OF THE INVENTION

It is an object of the invention to provide a computationally efficient system and method for detecting a time shift required for symbol synchronization of an OFDM or DMT signal that allows a simple means of eliminating narrow-band jamming signals.

Therefore, according to an aspect of the invention there is provided a method for estimating a time shift required for symbol synchronization in a block oriented digital communication system for receiving PHY symbols. The method includes the steps of sampling a received real signal, performing an N point discrete Fourier transform (DFT), multiplying by a complex conjugate of a DFT of a synch symbol, multiplying by a window of length N/(2d) where d is a decimation factor, shifting, forming a conjugate symmetric spectrum, performing an N/d inverse DFT (IDFT), and estimating the time shift required for symbol synchronization by detecting a position in time of a peak value.

According to another aspect of the invention there is provided a method for estimating a time shift required for symbol synchronization in a block oriented digital communication system for receiving PHY symbols. The method includes the steps of sampling a received complex signal, performing an N point discrete Fourier transform (DFT), multiplying by a complex conjugate of a DFT of a synch symbol, multiplying by a window of length N/(d) where d is a decimation factor, shifting, performing an N/d inverse DFT (IDFT), and estimating the time shift required for symbol synchronization by detecting a position in time of a peak value.

According to yet another aspect of the invention there is provided block oriented digital communication system for receiving PHY symbols, including means for sampling a received real signal, means for performing an N point discrete Fourier transform (DFT), means for multiplying by a complex conjugate of a DFT of a synch symbol, means for multiplying by a window of length N/(2d) where d is a decimation factor, means for shifting, means for forming a conjugate symmetric spectrum, means for performing an N/d inverse DFT (IDFT), and means for estimating a time shift required for symbol synchronization.

According to still another aspect of the invention there is provided block oriented digital communication system for receiving PHY symbols, including means for sampling a received complex signal, means for performing an N point discrete Fourier transform (DFT), means for multiplying by a complex conjugate of a DFT of a synch symbol, means for multiplying by a window of length N/(d) where d is a decimation factor, means for shifting, means for performing an N/d inverse DFT (IDFT), and means for estimating a time shift required for symbol synchronization.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
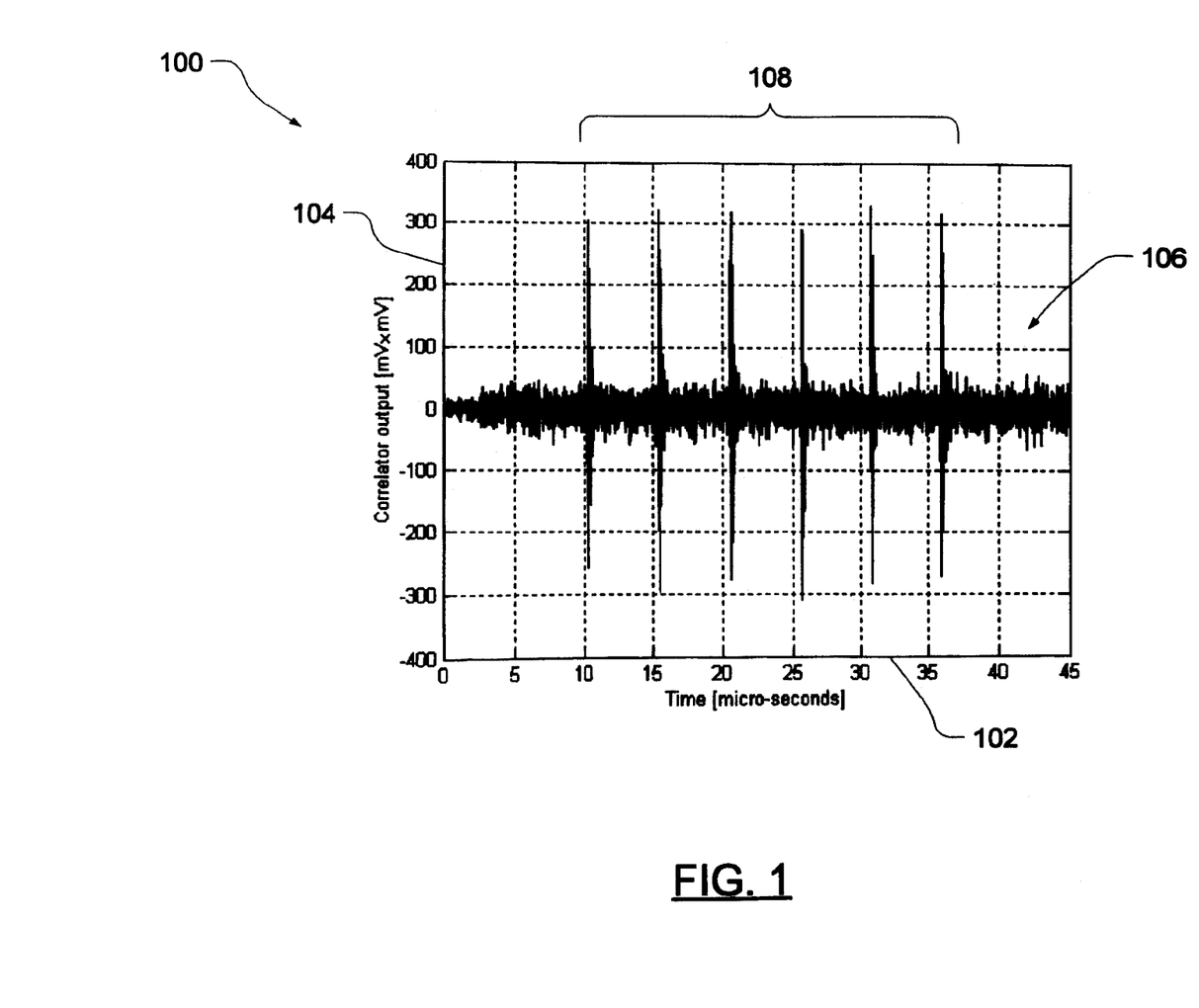
FIG. 1 is a plot of a correlation of a sampled received signal with a synch symbol.

Orthogonal frequency domain modulation (OFDM) and discrete multi-tone (DMT) are block oriented digital communication systems where a block of complex information bearing symbols (an information block) is encoded onto a transmit waveform consisting of a superposition of sinusoidal signals. This waveform lasts for a period of time referred to as a PHY symbol. Subsequent information blocks are transmitted in subsequent PHY symbols. The component sinusoidal signals are often referred to as sub-carriers or tones. Many such systems transmit a short synchronization burst prior to transmitting a series of PHY symbols bearing data. The synchronization signal typically consists of the periodic repetition of a predetermined PHY symbol. This predetermined PHY symbol is referred to as a synch symbol. Symbol acquisition and synchronization can be achieved by performing a running correlation of the sampled received signal with the synch symbol. When a correlation window passes over the synchronization burst, the output is a series of spikes that occur each time the window aligns properly with the PHY symbol. FIG. 1 shows a plot 100 of a typical output 106 of such a correlator. In this example there are 6 repetitions of the synch symbol and thus six distinct correlation peaks 108. An x-axis 102 represents time and a y-axis 104 represents the correlator output.

In DMT or OFDM systems, the information bearing symbols can be retrieved by performing a discrete Fourier transform (DFT) on the sampled PHY symbols and then performing an equalization by dividing each DFT output by a complex channel estimate. The channel estimate is commonly obtained by comparing the known DFT output of the transmitted synch symbol to the DFT output of the received synch symbol.

Figure 2:
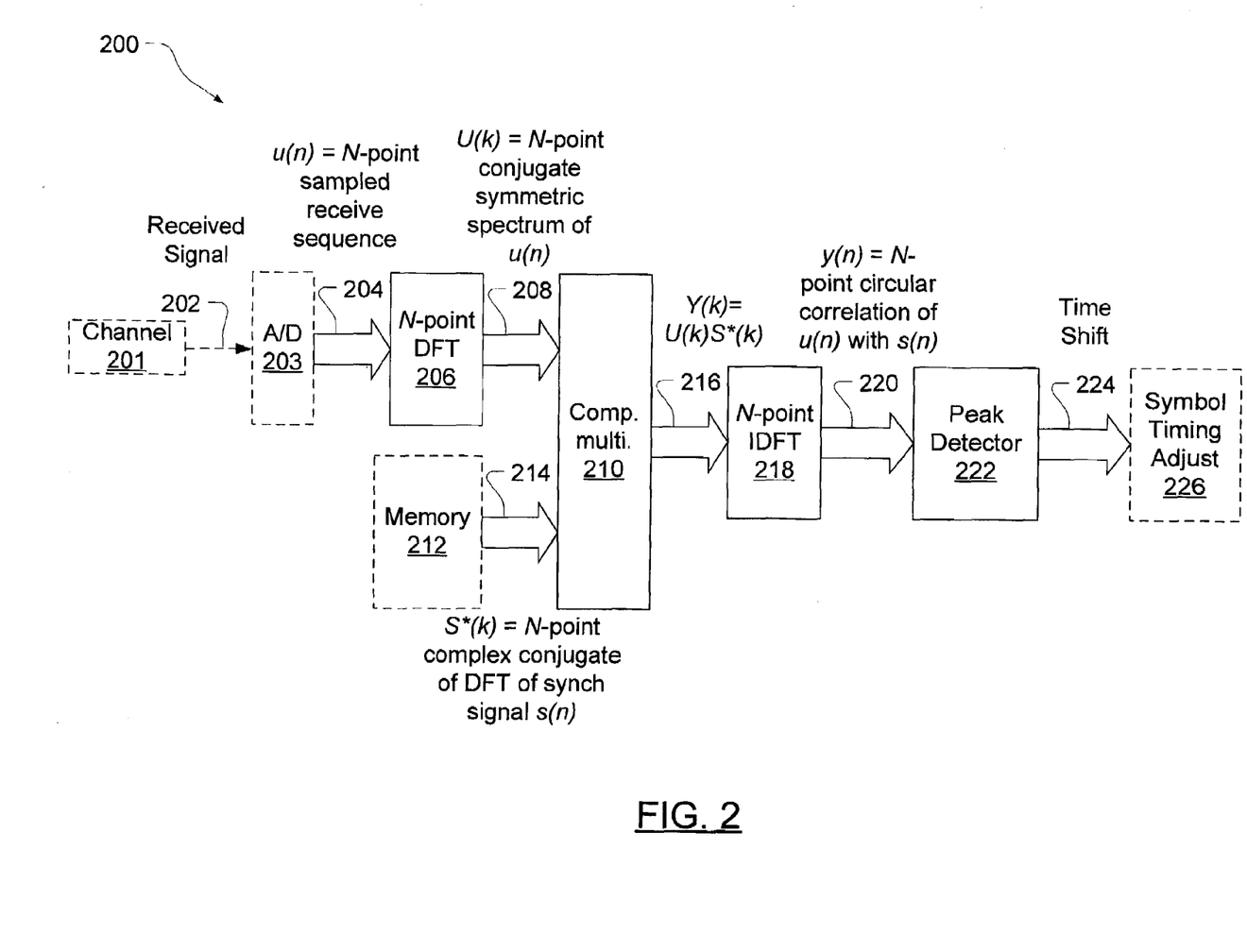
FIG. 2 is a block diagram of a conventional time shift detector of a block oriented digital communication system.

FIG. 2 shows a block diagram 200 of a conventional time shift detector of a block oriented digital communication system. A circular correlation operation is performed between two N-sample long sequences: an N-point sampled sequence u(n) 204 of a received signal 202 from an analog-to-digital (A/D) converter 203 connected to a channel 201 and a synch signal, s (n) (not shown). An N-point sequence S*(k) 214 is a complex conjugate of a DFT of the synch signal, s(n), is predetermined and stored in a memory 212. A DFT 206 of u(n) 204 is performed producing an N-point sequence, U(k) 208, representing a conjugate symmetric spectrum of u(n) 204. A point by point complex product 210 of U(k) 208 and S*(k) 214, produces Y(k) 216. Y(k) 216 is a series of N tones. Then an inverse DFT (IDFT) 218 is performed on Y(k) 216 producing y(n) 220 which is a circular correlation of u(n) 204 with B(n) (not shown). y(n) 220 is an approximation of a sampled impulse response of the channel 201. This is more efficient than performing a direct correlation if computationally efficient fast Fourier transform (FFT) and inverse FFT (IFFT) algorithms are employed instead of DFT 206 and IDFT 218 respectively. A peak detector 222 determines a time shift 224 of u(n) 204 by detecting peaks in y(n) 220. The time shift 224 is used by a symbol acquisition system 226 to synchronize and acquire PHY symbols.

A linear correlation of the signal s(n) of duration N with a periodic signal u(n) 204 of period N will yield exactly the same result as a circular correlation of s(n) with one N sample long period of u(n) 204. Therefore, in the case of the periodic synchronization burst, it is quite acceptable to perform a series of circular correlations rather than a linear correlation. Since a DMT receiver requires a DFT operation for data demodulation and since a transform method of correlation is computationally efficient, it makes sense to use it for DMT or OFDM systems. An additional advantage of using a DFT based correlator is that it provides a simple way of dealing with narrow-band jamming signals. After the DFT has been performed, the effect of narrow-band jamming signals will be limited to a few tones centered around the jamming frequency. These tones can simply be set to zero prior to any further processing.

Figure 3:
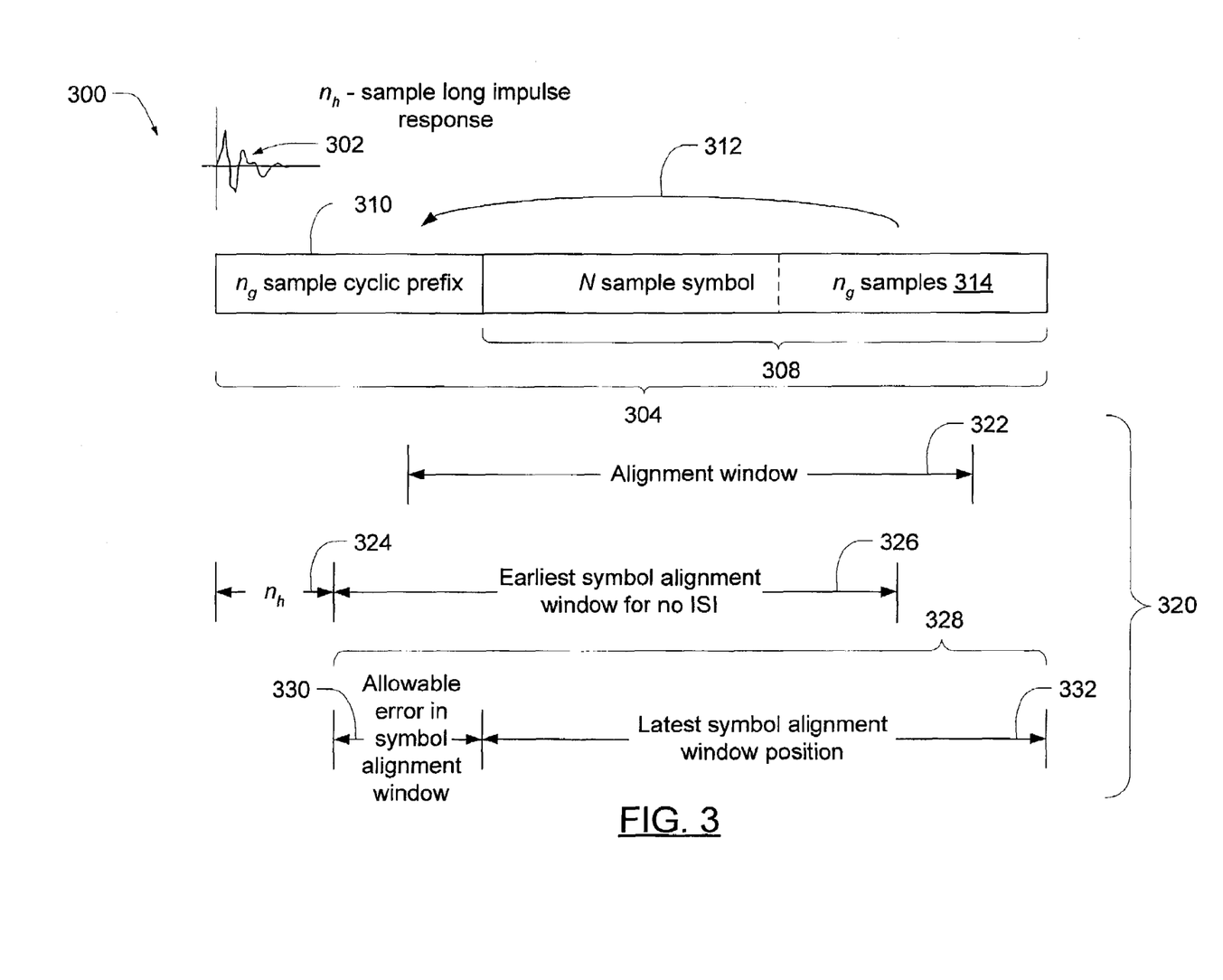
FIG. 3 is a schematic representation of a PHY symbol and timing relationships of an alignment window with respect to the PHY symbol.

FIG. 3 shows a schematic representation 300 of a PHY symbol 304 and timing relationships 320 of an alignment window 322 with respect to the PHY symbol 304. In DMT or OFDM systems, the PHY symbol 304 is usually transmitted with a cyclic prefix 310. The cyclic prefix 310 is a periodic extension of a PHY symbol 308 whereby $n_g$ samples 314 from the end of the PHY symbol 308 are copied 312 and prefixed to the PHY symbol 308 to create the $n_g$+N sample long PHY symbol 304.

A benefit of using a cyclic prefix 310 is that it is no longer necessary to ideally align 332 the N samples that are input to the receiver DFT exactly with an N sample long symbol 308. If an impulse response 302 of the channel 201 is $n_h$ samples long 324 and if $n_h < n_g$ then the alignment window 322 can be anywhere within an N+$n_g$−$n_h$ range 328 bracketed by an earliest symbol alignment window 326 for no inter-symbol interference (ISI) and a latest symbol alignment window 332 having an allowable error 330 of $n_g$−$n_h$. Hence, equalization can be achieved. This means that in the absence of noise, equalized data symbols will exactly match information bearing symbols.

Figure 4:
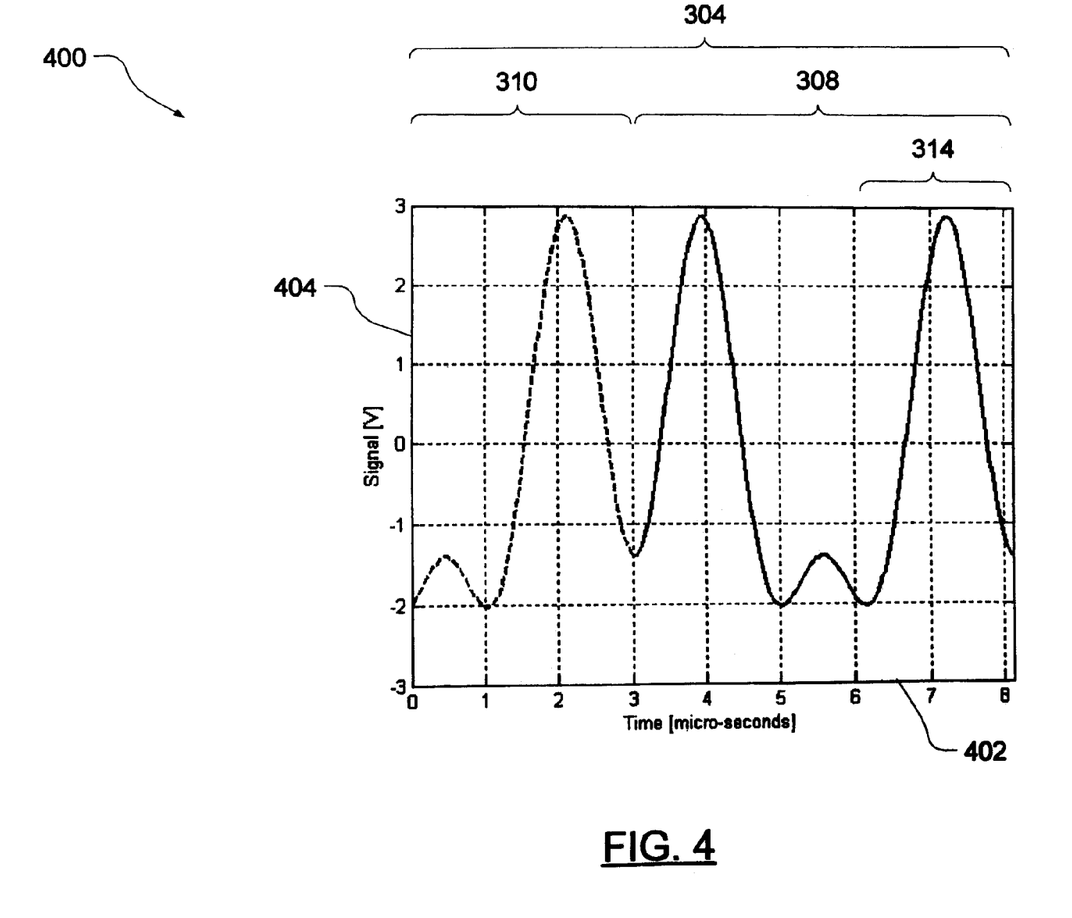
FIG. 4 is a plot of an example of the PHY symbol of FIG. 3.

FIG. 4 shows a plot 400 of an example of the PHY symbol 304 shown in FIG. 3 including the $n_g$ sample prefix 310, the N sample symbol 308 having the $n_g$ samples 314 at the end of the N sample symbol 308. An x-axis 402 represents time and a y-axis 404 represents a voltage of the received signal 202.

In accordance with a preferred embodiment of the invention the allowable error 330 in symbol alignment (FIG. 3) is leveraged to advantage by using an approximation to the circular correlation operation described with reference to FIG. 2, to reduce complexity in the IDFT operation 218.

Figure 5A:
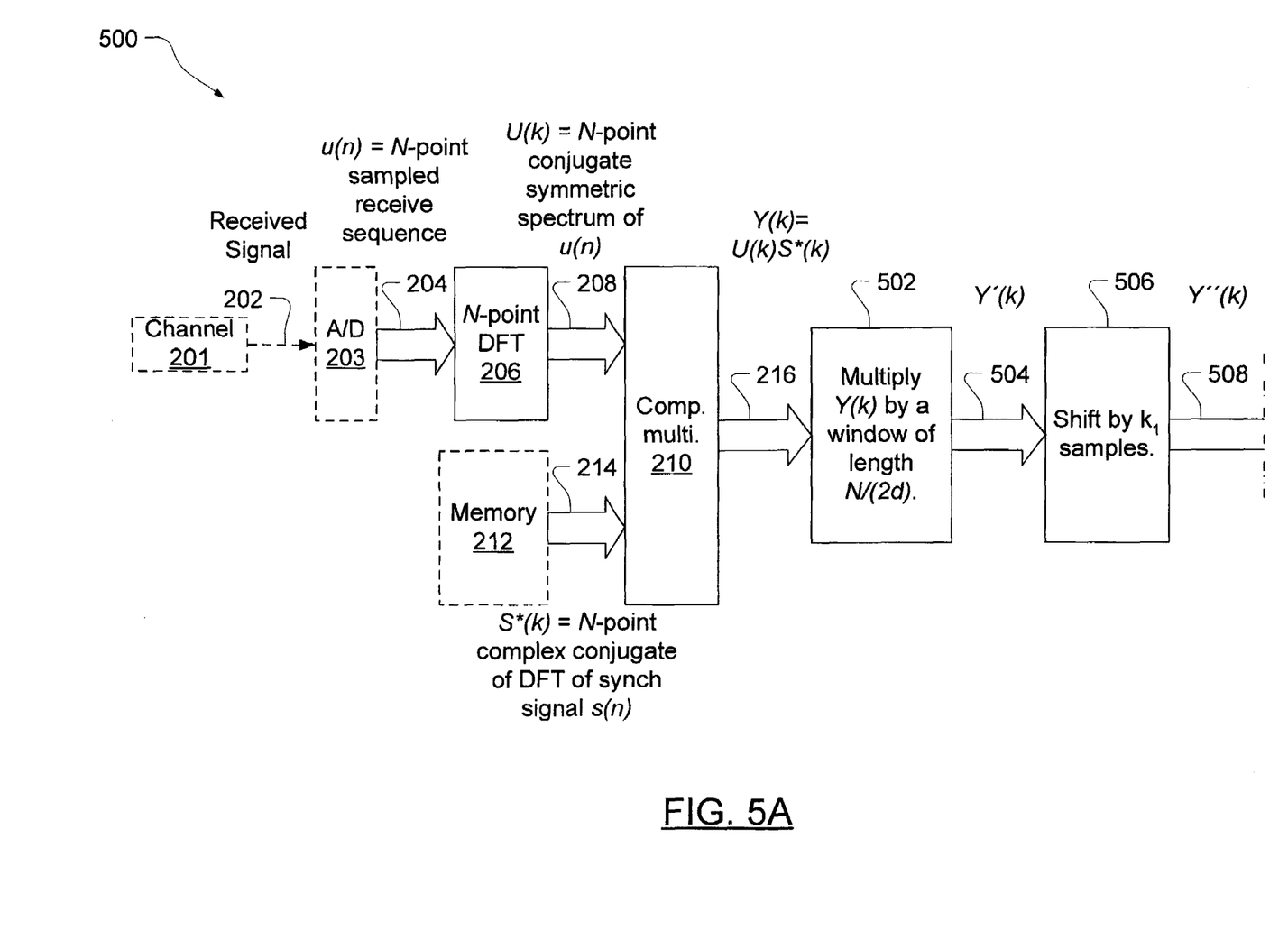
FIGS. 5A and 5B are respective parts of a block diagram of a time shift detector in accordance with the invention.
Figure 5B:
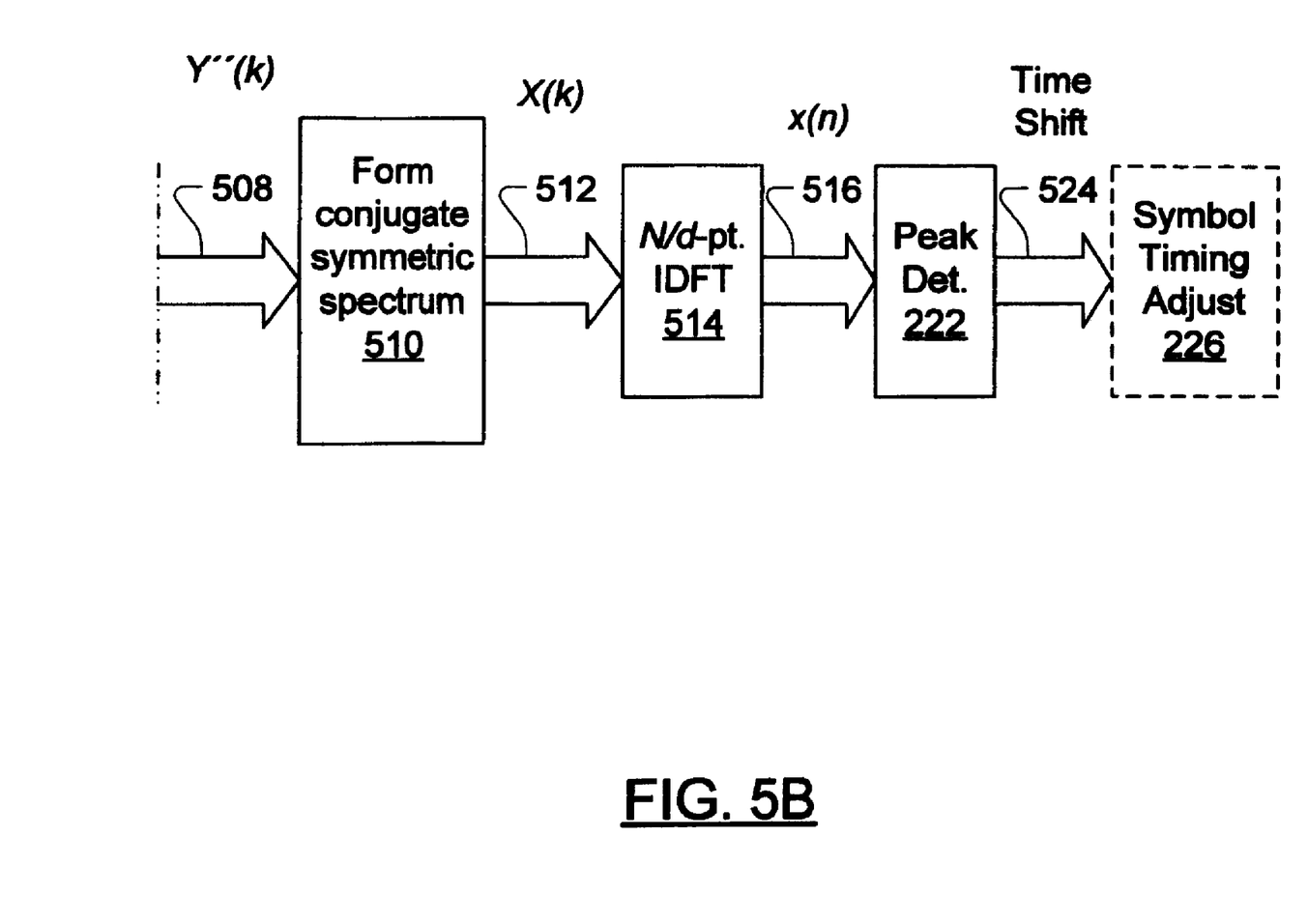

FIGS. 5A and 5B show an embodiment of a time shift detector 500 in accordance with the present invention, wherein the channel 201, the received signal 202, the A/D converter 203, u(n) 204, the N-point DFT 206, U(K) 208, the memory 212, S*(k) 214, the complex multiplier 210, Y(k) 216, peak detector 222, and symbol timing adjust 226 are identical to those shown in FIG. 2.

A value of $k_1$ is chosen such that indices of a contiguous set of tones of Y(k) 216 having a highest average signal power are designated by k=$k_1$:$k_1$+N/(2d)−1 where d is a decimation factor. Alternatively, a value of $k_1$ may be chosen such that indices of a contiguous set of tones of Y(k) 216 having a highest average signal-to-noise ratio are designated by k=$k_1$:$k_1$+N/(2d)−1. Y(k) 216 is then multiplied 502 by a rectangular window of length N/(2d) from $k_1$ to $k_1$+N/(2d)−1 to produce Y'(k) 504. This is equivalent to performing a circular convolution of the sequence y(n) 220 with a DFT of the window. This smoothes and slightly spreads the sequence x(n) 516 but does not significantly change the relative magnitude and locations of peaks because the DFT of the rectangular window is a fairly localized function. Alternatively, the window may be, for example, a Hamming, Hanning, Blackman, Bartlett, or Kaiser window.

The windowed spectrum Y'(k) 504 is then shifted 506 by $k_1$ samples. This is equivalent to multiplying the smoothed version of y(n) 220 by a complex exponential factor. This phase shifts each point but does not alter the magnitude.

Then an N/d point conjugate symmetric spectrum is formed 510 from Y"(k) 508:

$$X(k) = \begin{cases} Re\{Y(K_1)\} & k = 0 \\ Y(k_1 + k) & k = 1:N/2d - 1 \\ 0 & k = N/2d \\ Y*(k_1 + N/d - k) & k = N/2d + 1: N/d - 1 \end{cases}$$

At this point it is possible take an N-point IDFT of the windowed, shifted, conjugate symmetric spectrum and that produces an N-point approximation to the function y(n) 220. For the purpose of explanation, designate the windowed, shifted, conjugate symmetric spectrum as V(k). An N-point IDFT of V(k) is:

$$v(n) = \sum_{k=0}^{N-1} V(k) W_N^{-kn}$$

$$W_N = e^{-j2\pi/N}$$

However, because of the windowing 502, the only non-zero terms of this sum are:

$$v(n) = \sum_{k=0}^{N/2d-1} V(k) W_N^{-kn} + \sum_{k=N-N/2d}^{N-1} V(k) W_N^{-kn}$$

Now with a change of variable in the second sum and decimating the sequence v(n) by a factor of d, there is:

$$v(dn) = \sum_{k=0}^{N/2d-1} V(k) W_N^{-dkn} + \sum_{k=N-N/2d}^{N/d-1} V(k+N-N/d) W_N^{-dkn}$$

The samples of V(k) included in the sum above are the equal to X(k) 512, that is:

$V(k)=X(k) k=0:N/2d-1$ $V(k+N-N/d)=X(k) k=N/2d:N/d-1$

Therefore:

$$v(dn) = \sum_{k=0}^{N/d-1} X(k) W_{N/d}^{-kn} = x(n)$$

Then an N/d point IDFT 514 is performed to produce x(n) 516. This is an approximation to a decimation by d of the output sequence y(n) 220 (FIG. 2) that would have been obtained using the N-point IDFT 218.

A peak detector 222 then produces a time shift 524 for the symbol timing adjust 226. This approximation preserves the general shape of the impulse response estimate 302 and is sufficient to obtain synchronization within the allowable error 330 (FIG. 3) for a DMT or OFDM system having a cyclic prefix 310. It is well known in the art that if the decimation factor d is chosen so that N/d is a power of 2, then the IDFT operation 514 can be performed using an IFFT algorithm.

In order to further describe the invention, an example of the process shown in FIG. 2 is presented using the N-point IDFT 218, and then an example of the process shown in FIG. 5 using the N/d point IDFT 514 is described.

Figure 6:
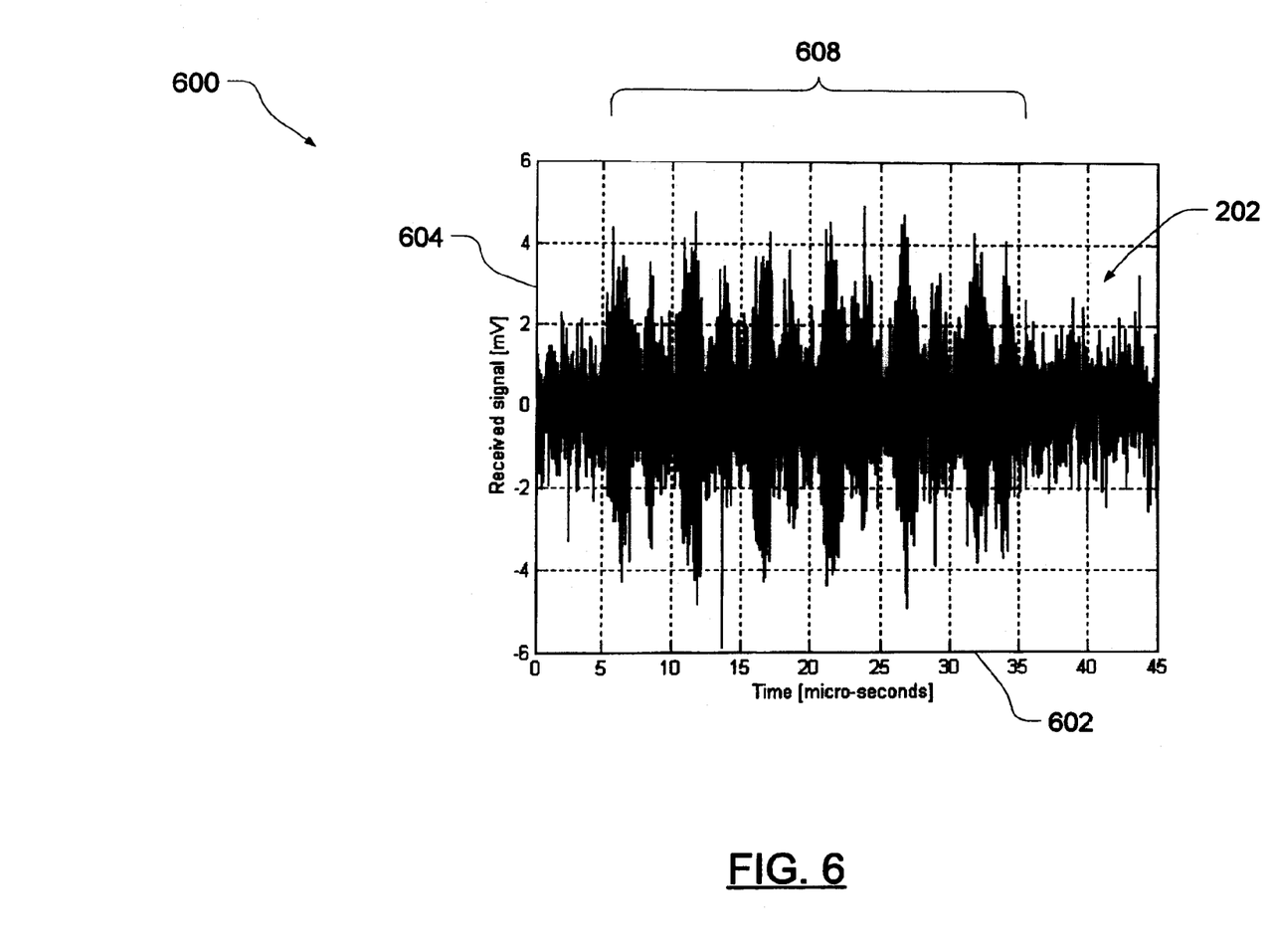
FIG. 6 is a plot of a receive signal having 6 repetitions of a typical synch symbol.

FIG. 6 is a plot 600 of the received signal 202 having 6 repetitions 608 of a typical synch symbol with a noise signal added (to simulate realistic conditions) wherein an x-axis 602 represents time and a y-axis 604 a voltage of the received signal 202.

Figure 7:
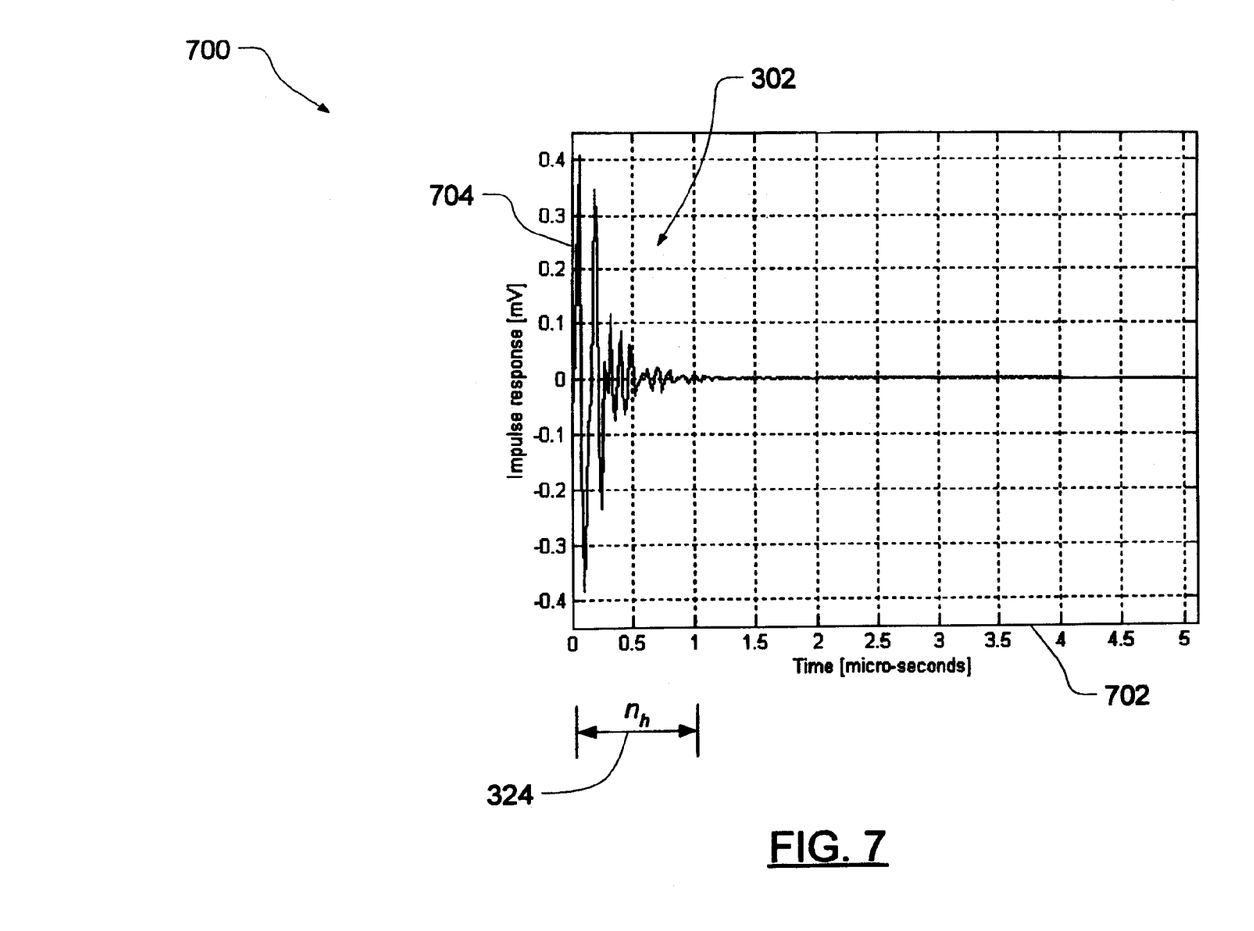
FIG. 7 is a plot of an impulse response of a channel.

FIG. 7 is a plot 700 of the impulse response 302 of the channel 201 having a length of $n_h$ 324 wherein an x-axis 702 represents time and a y-axis 704 represents a voltage of the impulse response 302.

Figure 8:
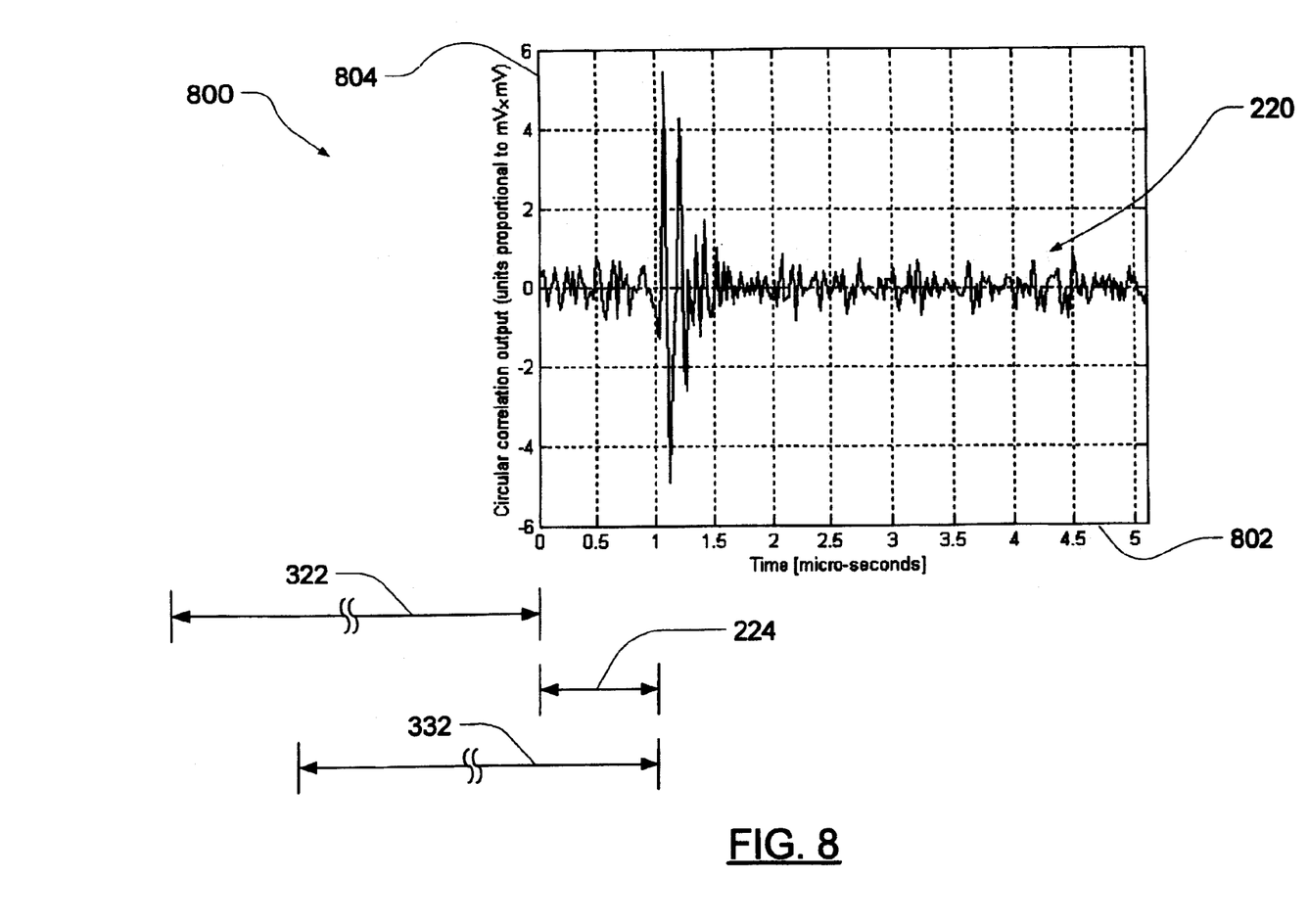
FIG. 8 is plot of y(n) shown in FIG. 2.

FIG. 8 shows a plot 800 of y(n) 220, the output of the N-point IDFT 218 after performing the operations of FIG. 2 wherein an x-axis 802 represents time and a y-axis 804 represents a value of y(n) 220. It can be seen that this is a noisy version of the impulse response 302 (FIG. 7) and that the current window 322 can be shifted by a time shift 224 of about 1.1 micro-seconds to align the current window 322 with the latest window position 332.

Figure 9:
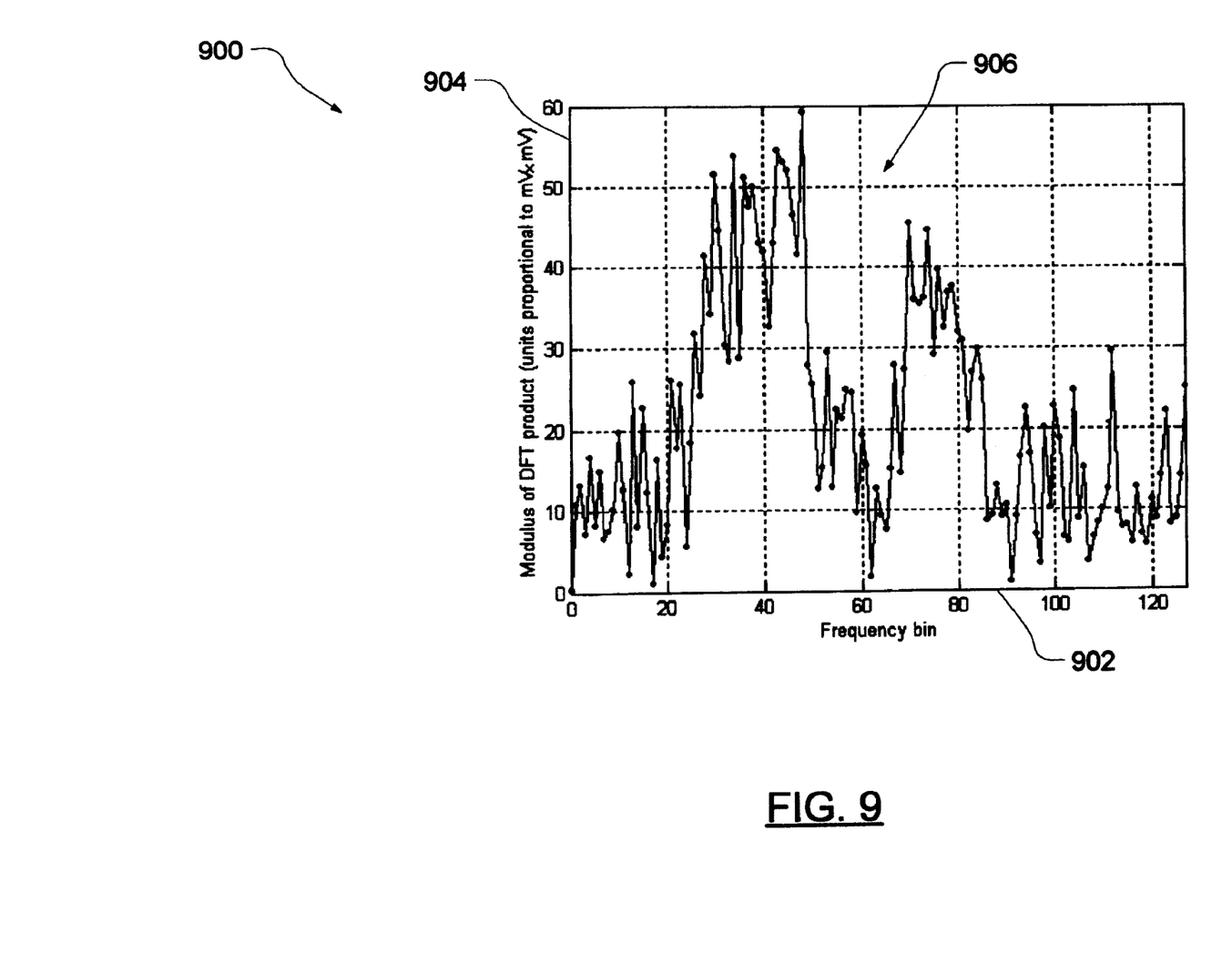
FIG. 9 is a plot of a modulus of Y(k) shown in FIGS. 2 and 5A.

FIG. 9 is a plot 900 of the modulus of the product Y(k)=U(k)S*(k) 906 where U(k) 208 is a DFT of the received time sequence u(n) 204 and S*(k) 214 is a complex conjugate of a DFT of the synch signal and wherein an x-axis 902 represents frequency and a y-axis 904 represents a modulus of Y(k) 906. Since the received signal 202 is real, a spectrum of the received signal has conjugate symmetry i.e. Y(k)=Y*(N-k). Therefore, although the duration of the DFT is N=256, the plot 900 only shows the samples for k=0:127 because the remaining samples are just a mirror image of those plotted.

Figure 10:
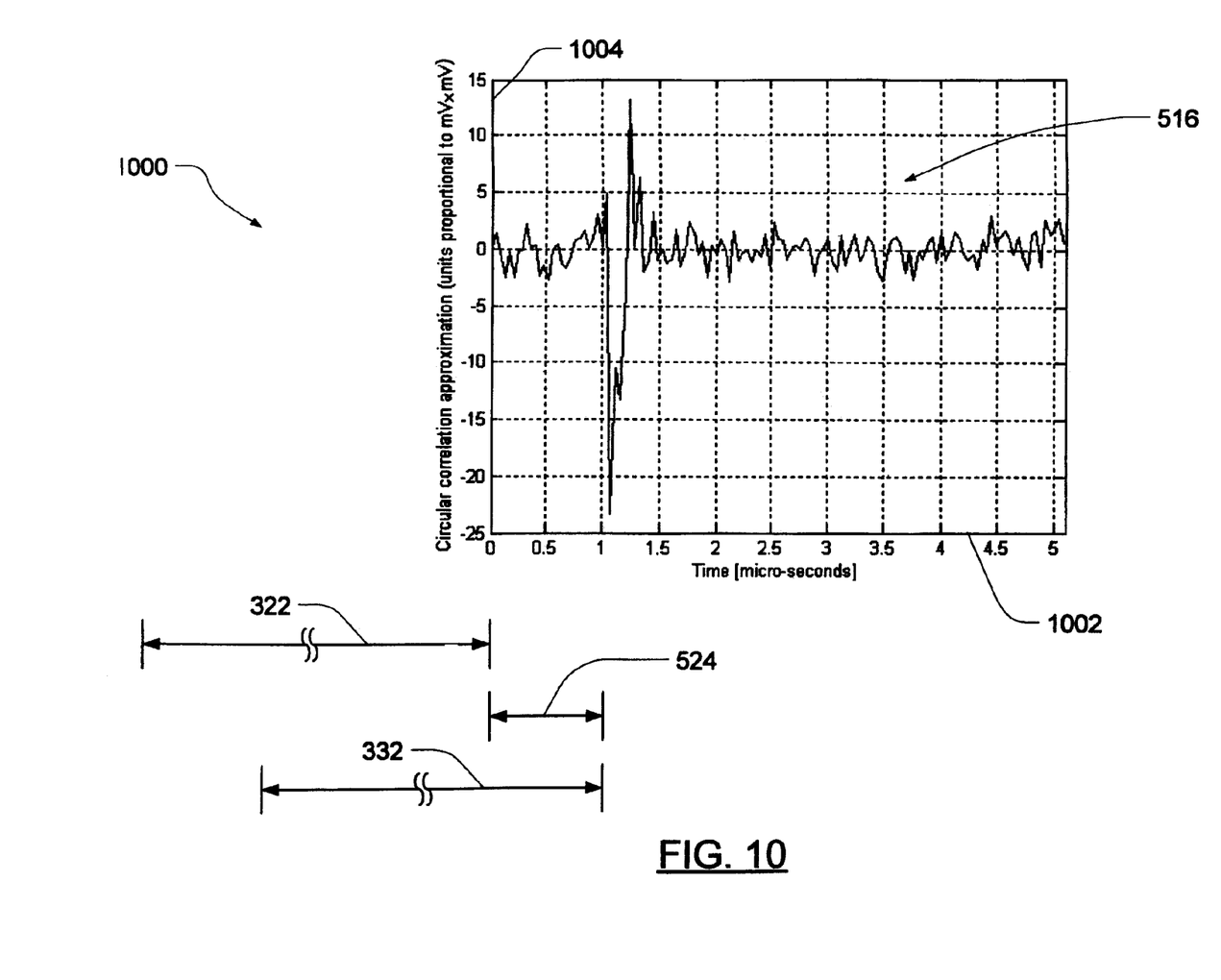
FIG. 10 is a plot of x(n) shown FIG. 5B.

The N/d point series x(n) 516 (FIG. 5) is an approximation of a decimation by d of the series y(n) 200. FIG. 10 shows a plot 1000 of x(n) 516 after performing the operations of FIGS. 5A and 5B with a decimation factor d=2 wherein an x-axis 1002 represents time and a y-axis represents a value of x(n) 516. Thus, x(n) 516 is a decimated by 2 approximation to y(n) 220 of FIG. 8. A peak in the decimated output shows that the current window 322 can be shifted by a time shift 524 of about 1.1 micro-seconds to align the current window 322 with the latest window position 332. This time shift 524 is very close to the time shift 224 obtained with the full 256-point IDFT 218.

It should be noted that an optimum value for the symbol timing correction may not necessarily be determined by the sample in the series x(n) 516 with the largest absolute value. Additional processing techniques such as searching for the peak in the smoothed or filtered absolute value of x(n) 516 may yield a more representative value.

The above description addresses a baseband system wherein the received signal 202 is real. It is therefore preferable to perform an N point DFT 206 of u(n) 204 and an N/d point IDFT 514 of X(k) 512 using an N/2 point DFT and N/(2d) point IDFT respectively as described below.

Start with the series u(n) 204 of length N. Form a complex series:

$u_c(n)=u(2n)+ju(2n+1) n=0:N/2-1$

Now define $U_c(k)$ to be the N/2 point DFT of $u_c(n)$. The DFT of u(n), U(k) 208, will be:

$$U(k) = \frac{1}{2}[U_c(k) + U_c^*(N/2 - k) - jW_N^k(U_c(k) - U_c^*(N/2 - k))]$$

$k = 0: N/2 - 1$ $$U(k) = \frac{1}{2}[U_c(0) + U_c^*(0) - j(U_c(0) - U_c^*(0))]$$

$k = N/2$ $U(k) = U*(N-k)$ $k = N/2 + 1: N - 1$ where $W_N = e^{-j2\pi/N}$.

Since X(k) 512 (as in paragraph 0 above) is a conjugate symmetric spectrum, an N/d point IDFT 514 of X(k) 512 can be determined by forming a sequence:

$$X_c(k) = \frac{1}{2}[X(k) + X*(N/2-k) + jW_N^{-k}(X(k) - X*(N/2-k))]$$
$$k = 0: N/(2d) - 1$$

Then compute $x_c(n)$, an N/(2d) point IDFT of $X_c(k)$. Even and odd points of x(n) 516 are the real and imaginary parts of $x_c(n)$ respectively.

The above description is related to a conventional DMT receiver that computes a DFT of a received time series. A well know weakness of the DFT is that an unwanted narrow-band interfering signal can affect several DFT outputs in a vicinity of the interfering signal frequency. This effect can be minimized by pre-summing weighted time samples from the cyclic prefix 310 with weighted samples from the end of the PHY symbol 314. This can be done in such a way that it doesn't affect the desired signal. The reduced complexity correlation technique described above also works when this type of pre-summing is used.

In radio frequency (RF) modulated systems the received signal 202 is a complex signal formed from the in-phase and quadrature components of a received RF signal. In this case the correlation output is a complex sequence and the symbol alignment is achieved by searching for a peak in the modulus of the complex signal. A decimated sequence is obtained by performing an N/d point IDFT using N/d contiguous tones with the largest energy. There is no need to form a conjugate symmetric spectrum.

The present invention therefore provides a system and method that is computationally efficient, has a simple means of eliminating narrow-band jamming signals and benefits from the reduced complexity of an N/d point IFFT.

The embodiment of the invention described above is intended to be exemplary only. The scope of the invention is therefore intended to be limited solely by the scope of the appended claims.

What is claimed is:

1. A method for estimating a time shift for synchronizing to a synch symbol, the method comprising:
   sampling a received signal to produce a sequence of samples of the signal;
   performing a transform on the sequence of samples of the signal to produce a sequence of N samples of a spectrum of the signal;
   multiplying the samples of the spectrum of the signal by respective samples of a spectrum corresponding to the synch symbol to produce a sequence of correlation spectral samples;
   selecting a contiguous subset of the correlation spectral samples;
   shifting the selected subset by a number of samples so that an N/d point inverse transform of an output spectrum derived from the shifted subset is an approximation to a decimation by d of an inverse transform of the sequence of correlation spectral samples; and
   estimating the time shift by detecting a position of a peak in the inverse transform of the output spectrum.

2. The method of claim 1, wherein the transform comprises a discrete Fourier transform.

3. The method of claim 1, wherein the spectrum corresponding to the synch symbol comprises a complex conjugate of a transform of the synch symbol.

4. The method of claim 1, wherein the received signal comprises a real signal.

5. The method of claim 4, wherein selecting the contiguous subset comprises multiplying the sequence of correlation spectral samples by a window of length N/(2d).

6. The method of claim 4, wherein the output spectrum derived from the shifted subset comprises a conjugate symmetric spectrum formed from the shifted subset.

7. The method of claim 1, wherein the received signal comprises a complex signal.

8. The method of claim 7, wherein selecting the contiguous subset comprises multiplying the sequence of correlation spectral samples by a window of length N/(d).

9. The method of claim 7, wherein the output spectrum derived from the shifted subset comprises the shifted subset.

10. The method of claim 1, wherein the contiguous subset of the correlation spectral samples have a highest average power of the correlation spectral samples.

11. A communication system, comprising:
    means for sampling a received signal to produce a sequence of samples of the signal;
    means for performing a transform on the sequence of samples of the signal to produce a sequence of N samples of a spectrum of the signal;
    means for multiplying the samples of the spectrum of the signal by respective samples of a spectrum corresponding to the synch symbol to produce a sequence of correlation spectral samples;
    means for selecting a contiguous subset of the correlation spectral samples;
    means for shifting the selected subset by a number of samples so that an N/d point inverse transform of an output spectrum derived from the shifted subset is an approximation to a decimation by d of an inverse transform of the sequence of correlation spectral samples; and
    means for estimating the time shift by detecting a position of a peak in the inverse transform of the output spectrum.

12. The system of claim 11, wherein the transform comprises a discrete Fourier transform.

13. The system of claim 11, wherein the spectrum corresponding to the synch symbol comprises a complex conjugate of a transform of the synch symbol.

14. The system of claim 11, wherein the received signal comprises a real signal.

15. The system of claim 14, wherein selecting the contiguous subset comprises multiplying the sequence of correlation spectral samples by a window of length N/(2d).

16. The system of claim 14, wherein the output spectrum derived from the shifted subset comprises a conjugate symmetric spectrum formed from the shifted subset.

17. The system of claim 11, wherein the received signal comprises a complex signal.

18. The system of claim 17, wherein selecting the contiguous subset comprises multiplying the sequence of correlation spectral samples by a window of length N/(d).

19. The system of claim 17, wherein the output spectrum derived from the shifted subset comprises the shifted subset.

20. The system of claim 11, wherein the contiguous subset of the correlation spectral samples have a highest average power of the correlation spectral samples.

* * * * *